June 26, 1928.

A. DEWANDRE

VALVE MECHANISM

Original Filed Sept. 14, 1925

1,675,023

INVENTOR.
ALBERT DEWANDRE,
BY
ATTORNEY.

Patented June 26, 1928.

1,675,023

UNITED STATES PATENT OFFICE.

ALBERT DEWANDRE, OF LIEGE, BELGIUM, ASSIGNOR TO SERVO-FREIN DEWANDRE SOCIÉTÉ ANONYME, OF LIEGE, BELGIUM.

VALVE MECHANISM.

Original application filed September 14, 1925, Serial No. 56,320. Divided and this application filed June 3, 1927. Serial No. 196,349.

This invention is directed to an improvement in oppositely-acting sliding valves arranged in compact form and mounted for an interguiding relation and cooperation to insure ease and certainty of valve movement, and is a division of my coopending application, Serial No. 56,320, filed September 14, 1925.

The primary object of the invention is the provision of valves mounted for independent movement, with each formed with interfitting sleeve like extensions of such length as to provide an extended guide for each valve during the full movement thereof; the extensions further serving as a housing for the means for seating the valves.

A further object is the provision of means whereby the valves may be opened through a single actuator arranged at one end of the valve casing, the means between the valves and actuator being concentrically arranged, with one such means extending longitudinally of and housed within the guiding extensions.

The invention is illustrated in the accompanying drawings, in which.

Figure 1:
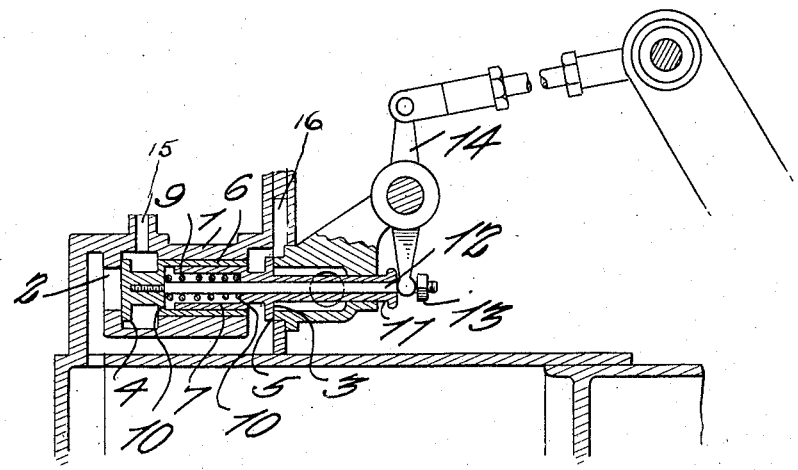
Fig. 1 is a longitudinal sectional view of the valve structure, showing the valves in normal closed position.
Figure 2:
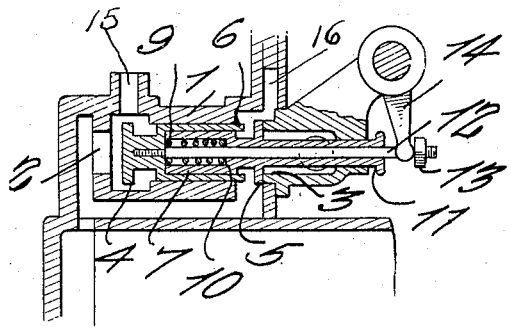
Fig. 2 is a similar view showing the suction or inlet valve open.
Figure 3:
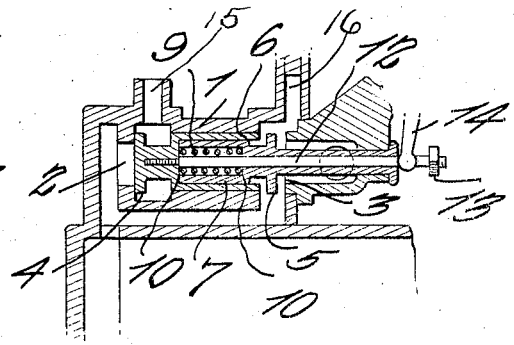
Fig. 3 is a similar view showing the atmospheric or outlet valve open.

The valve structure comprises a casing 1, including a central section of interior cylindrical formation and otherwise of any appropriate form and size. The casing has valve-controlled openings 2 and 3 at the opposite end, or at appropriate points beyond and in line with the central section. Valves 4 and 5, here shown as of an ordinary disk type, though obviously of any appropriate form for sealing the valve-openings 2 and 3. are arranged in the casing for opening and closing movements. One such valve, as 4 is provided with a hollow cylindrical extension 6 constituting an outer guide and having a sliding non-leaking fit within the central section of the casing, the other of such valves, as 5 having a hollow cylindrical extension 7, constituting an inner guide, arranged for a sliding non-leaking fit within the outer guide 6. The guides thus provide extended bearings for the respective valves, permitting the independent or relative movement of the valves with ease and certainty, holding the valves in true relation to their seats under all conditions of use.

The valves are here shown as designed for automatic closing, for which purpose a coil spring 9 is arranged between the valves. The inner guide serves as a housing for this spring, the respectively outer or opposite ends of the guides 6 and 7 being closed or shouldered at 9 and 10 to form end abutments for the spring. In the opening movement of either valve, the guide therefor moves relatively toward the other valve, and thus the spring is tensioned to compel a closing movement of such valve when free to act.

It is further desired in the particular valve being described, that the respective valves be selectively opened through the use of a single actuator, and that the actuator and related valve connections be such that one valve will be release to the influence of the closing spring before the other valve can be opened. Again the actuator must be capable of a neutral position in which both valves are under the free influence of the closing spring.

To provide for valve operation by the actuator, the valve 5 is provided with a hollow extension 11, extending in opposition to its guiding sleeve and terminating beyond the valve casing. The other valve 4 is provided with a rod 12, which extends through the inner guide sleeve 7 and through and beyond the free end of the extension 11. The free terminal of the rod is provided with an abutment 13, here shown as a nut threaded and therefore adjustable on the rod.

The actuator, preferably in the form of a lever 14 has one end formed with an opening to loosely receive the rod 12, between the end of valve extension 11 and the abutment 13 on valve rod 12, the relation being such that the actuator may occupy a neutral position, that is one which is free of pressure on either the valve extension or the abutment.

In such neutral position, the valves are both free of actuator influence and spring 9 functions to maintain both valves closed. On moving the actuator to exert pressure on the abutment, valve 4 is opened, further tensioning spring 9 to insure a certain closing of valve 5. On moving the actuator to exert pressure on the valve extension 11, valve 5 is opened and the closing tension of spring 9 on valve 4 is increased. Thus the actuator while serving to only positively open the valves, nevertheless increases the closing tension of the spring on the valve not affected, thus insuring certainty of valve action.

The guiding sleeves of both valves provide an enlarged interfitting bearing guide for both valves in opening and closing, and in addition to housing and protecting the valve-closing spring, insure through this extended and comparatively large guiding surface, a true and proper sealing movement of the valves in action, and materially reduces the necessity for valve refitting and readjustment, otherwise incident to valves of this type. The guiding sleeves 6 and 7 may if desired have packing rings, as indicated, to insure a non-leaking fit.

The valve structure described is admirably adapted for, though in no wise limited to, use as a distributor in servo brake mechanism where the power means is subjected to pressure differences through control of engine suction and atmospheric admission. In this use valve 4 will control engine suction through duct 15 leading to the power cylinder, while valve 5 will control a passage 16 open to the atmosphere and leading to the duct 15 between the valve 4 and the power cylinder.

What is claimed as new is:—

1. A valve structure including a casing oppositely acting valves controlling ports in said casing, and a guiding sleeve projecting from each valve, one of said sleeves having a sliding non-leaking fit in the casing and the other of said sleeves having a sliding non-leaking fit in the first mentioned sleeve.

2. A valve structure including a casing oppositely acting valves controlling ports in said casing, and concentric relatively sliding sleeves having a non-leaking bearing in the casing and relative to each other, said sleeves being respectively carried by said valves.

3. A valve structure including a casing oppositely acting valves controlling ports in said casing, an outer sleeve projecting from one valve and having a sliding non-leaking fit within the casing, an inner sleeve carried by the other valve and having a sliding non-leaking fit in the outer sleeve, and a valve closing spring housed in the inner sleeve.

4. A valve structure including a casing oppositely acting valves controlling ports in said casing, an outer sleeve projecting from one valve and having a sliding non-leaking fit within the casing, an inner sleeve carried by the other valve and having a sliding non-leaking fit in the outer sleeve, and a valve closing spring housed in the inner sleeve, and valve opening means carried by each valve and projected beyond one end of the casing.

5. A valve structure including a casing oppositely acting valves controlling ports in said casing, an outer sleeve projecting from one valve and having a sliding non-leaking fit within the casing, an inner sleeve carried by the other valve and having a sliding non-leaking fit in the outer sleeve, and a valve closing spring housed in the inner sleeve, a valve opening extension carried by one valve, and projected beyond one end of the casing, and a valve opening rod carried by the other valve and extended through the inner sleeve and through and beyond such extension.

6. A valve structure including a casing oppositely acting valves controlling ports in said casing, an outer sleeve projecting from one valve and having a sliding non-leaking fit within the casing, an inner sleeve carried by the other valve and having a sliding non-leaking fit in the outer sleeve, and a valve closing spring housed in the inner sleeve, a valve opening extension carried by one valve and projected beyond one end of the casing, and a valve opening rod carried by the other valve and extended through the inner sleeve and through and beyond such extension, and an actuator to selectively exert pressure on said extension or a pull on said rod.

7. A valve structure including a casing oppositely acting valves controlling ports in said casing, an outer sleeve projecting from one valve and having a sliding non-leaking fit within the casing, an inner sleeve carried by the other valve and having a sliding non-leaking fit in the outer sleeve, and a valve closing spring housed in the inner sleeve, a valve opening extension carried by one valve and projected beyond one end of the casing, and a valve opening rod carried by the other valve and extended through the inner sleeve and through and beyond such extension, and an actuator to selectively operate said extension on said rod for opening the connected valve.

8. A valve structure including a casing oppositely acting valves controlling ports in said casing, an outer sleeve projecting from one valve and having a sliding non-leaking fit within the casing, an inner sleeve carried by the other valve and having a sliding non-leaking fit in the outer sleeve, and a valve closing spring housed in the inner sleeve, a valve opening extension carried by one valve and projected beyond one end of the casing, and a valve opening rod carried by the other valve and extended through the inner sleeve and through and beyond such extension, an abutment on the free end of said rod, and an actuator selectively exerting pressure on said extension or said abutment to open the connected valve.

9. In a servo-brake mechanism, a distributor comprising a casing, an engine suction control valve therein, an atmospheric vent control valve therein, hollow guide sleeves projecting from the respective valves, the sleeve of one valve having a sliding non-leaking fit in the casing, the sleeve of the other valve having a sliding non-leaking fit within the first mentioned sleeve, an extension from one valve projecting beyond the casing, a rod carried by the other valve and extending through the inner guide sleeve and through the extension, an abutment on the free terminal of said rod, an actuator engaging the abutment on movement in one direction to open the rod connected valve and engaging the extension on movement in the opposite direction to open the remaining valve, and a spring housed in the inner guide sleeve and serving to close either or both valves when such valve or valves are free of actuator influence.

In testimony whereof I affix my signature.

ALBERT DEWANDRE.